Dec. 25, 1962   J. U. WHITE   3,069,966
OPTICAL APPARATUS EMPLOYING DIFFRACTION GRATING
Filed Dec. 7, 1959   4 Sheets-Sheet 4
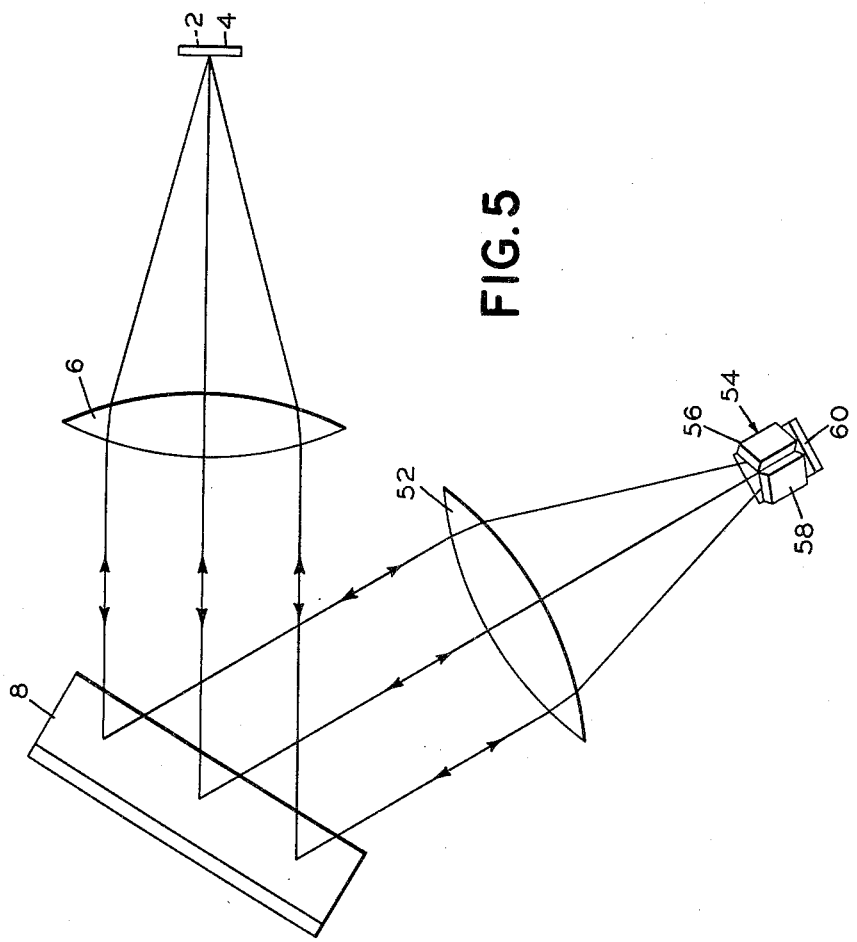

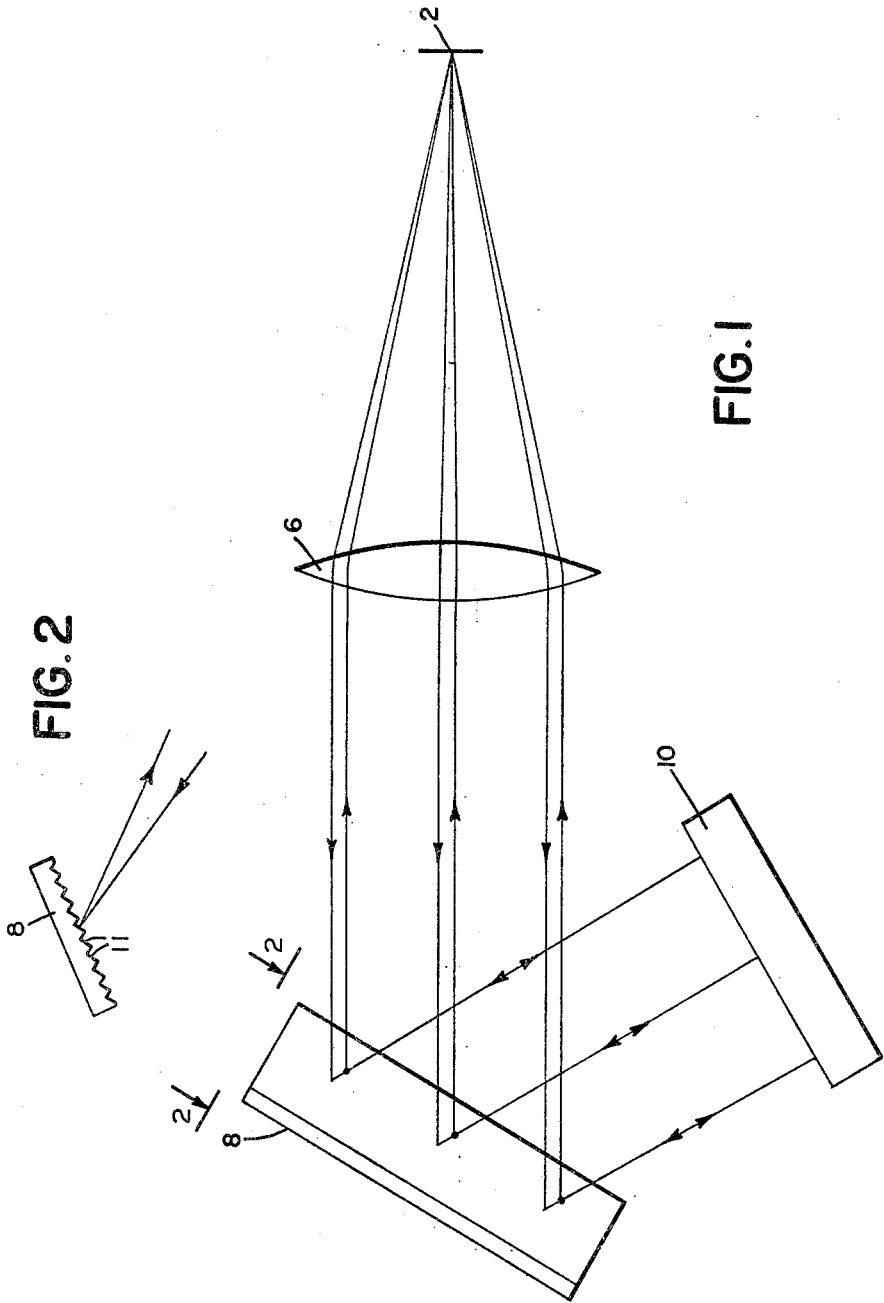

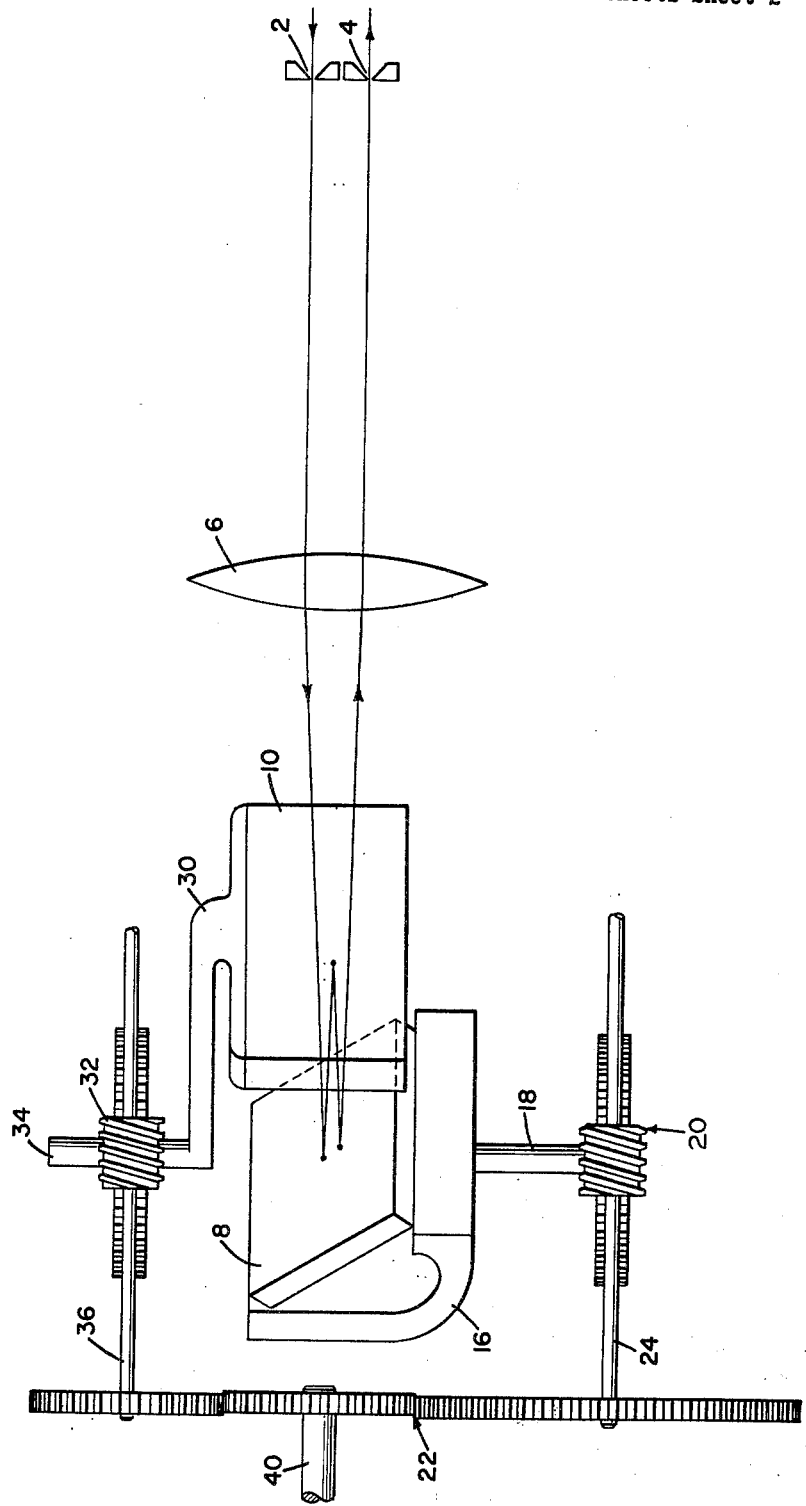

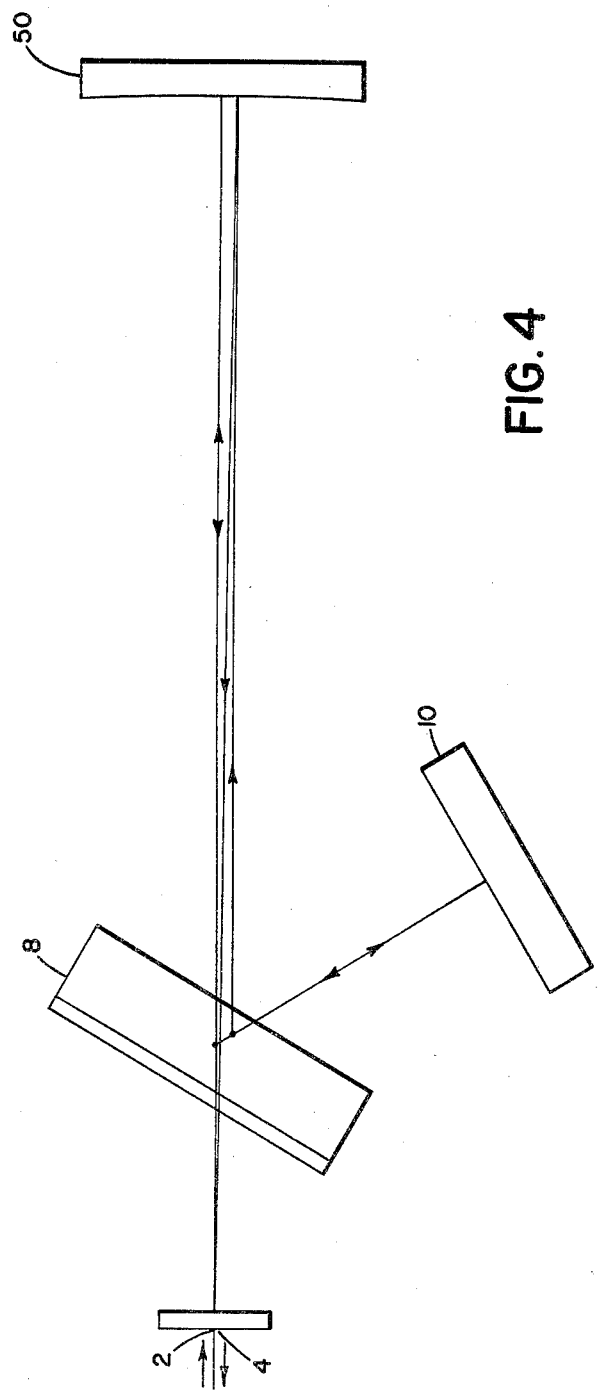

United States Patent Office 3,069,966
Patented Dec. 25, 1962

3,069,966
OPTICAL APPARATUS EMPLOYING
DIFFRACTION GRATING
John U. White, Darien, Conn.
(% The White Development Corp., 80 Lincoln Ave.,
Stamford, Conn.)
Filed Dec. 7, 1959, Ser. No. 857,925
9 Claims. (Cl. 88—14)

This invention relates to spectroscopy and, more particularly, to monochromators employing a diffraction grating.

In monochromators for selectively isolating portions of a spectrum, it is often desirable that the apparatus operate over a wide range of wave-lengths with minimum adjustment in or alternations to the apparatus.

Some monochromators have heretofore employed a diffraction grating, but have employed a given grating in only a relatively narrow range of wave-lengths. Where a wider range of wave-length was desired, various proposals for obtaining such increase in range have heretofore been accompanied by various disadvantages, such as variation in the intensity or resolution, or rotation of the image at the exit slit, or the necessity of using in the monochromator first one grating for one portion of the range and then other gratings for other portions of the range.

One object of the invention is to provide a monochromator which is operable over a wide range of wavelengths, with a single diffraction grating, without sacrificing intensity and resolution.

It is a still further object of the invention to provide such a monochromator in which the image orientation at the exit slit remains fixed and in which any variations of the curvature of this image is minimized, throughout the range of operation. These and other objects will become more apparent from the following description and attached drawings of illustrative embodiments, in which:

FIG. 1 is a plan view of an embodiment of the invention using a lens as the collimator;

FIG. 2 is an end view of the preferred type of grating;

FIG. 3 is an elevation view of the embodiment of FIG. 1 showing, in elevation, a mechanism for rotating the grating;

FIG. 4 is a plan view of the device of FIG. 1 showing a concave mirror as the collimator; and FIG. 5 is a plan view of a modified embodiment of the invention.

In the apparatus described herein, there is provided a monochromator employing as its dispersing element a diffraction grating, oriented with respect to the other components of the system and to the radiation path so that, throughout the operation of the apparatus, the grating is used at such a position as to provide substantially constant, maximum radiation intensity. Associated with the grating there are provided apparatus for directing radiation onto the grating, means for receiving diffracted radiation from the grating, said means being positioned and arranged to return the diffracted radiation back to the grating for a second diffraction, and apparatus for receiving the twice diffracted radiation from the grating. Thus, in one embodiment of the invention, radiation is directed from a source, through an entrance slit, onto the grating for a first diffraction, thence from the grating to a mirror and back to the grating for a second diffraction, and, from the grating, the twice diffracted radiation is directed to a point of discharge, typically an exit slit.

Between the entrance slit and the grating, a collimator, which may be in the form of a lens, a concave mirror, or the like, is positioned to receive radiation from the entrance slit and to direct collimated radiation onto the grating. Similarly, a collimator is positioned between the grating and the exit slit to receive the radiation after diffraction by the grating and to focus the diffracted radiation on the exit slit. It is preferred to position the entrance and exit slits so that a single collimator can be employed to direct the radiation from the entrance slit to the grating and from the grating to the exit slit.

In the apparatus, it is preferred that the grating be of the blazed type. With such a grating, the advantages provided by the apparatus are significantly enhanced. The grating is mounted with respect to the other components of the system so that the direction of the blaze of the grating lies in the plane defined by the direction of the incident radiation and direction of the used part of the diffracted radiation. Thus, solely by way of example, assume that the entrance slit is horizontal, and directions of the incident radiation and the used part of the diffracted radiation are also substantially horizontal. The grating may then, in such an illustrative embodiment, be mounted for rotation about a vertical axis, the grating being oriented so that its rulings are horizontal. The grating is so mounted that it is tilted at a fixed angle with respect to the plane of the incident radiation, the angle being so chosen that the grating is always oriented in the system to provide maximum radiation intensity. This would be accomplished, in the illustration here under consideration, by maintaining the blazed grating tilted at such an angle that the direction of its blaze is in a horizontal plane, and remains in that plane as the grating rotates.

After diffraction by the grating, the used part of the diffracted radiation is reflected and returned to the grating for the second diffraction, from whence it is directed to the exit slit. Thus, in operation of the apparatus over a wide range of wave-lengths, as the grating is rotated on its axis, it provides maximum radiation intensity at the exit slit. In one embodiment of the invention, after diffraction by the grating, the used part of the diffracted radiation is reflected by means comprising a flat, vertical mirror, and returned to the grating for the second diffraction, from whence it is directed to the exit slit and in another embodiment of the invention, the used part of the diffracted radiation is directed by a lens into a corner cube reflector or mirror and returned to the grating for the second diffraction, from whence it is directed to the exit slit.

Referring now to the drawings, particularly FIGS. 1 and 3, there is shown an entrance slit 2, an exit slit 4, coplanar and in vertical alignment with the entrance slit 2, a grating 8, and a lens 6 positioned intermediate the entrance and exit slits 2, 4 and grating 8. A flat mirror 10 is positioned outside the path between the lens 6 and grating 8 with its reflecting surface normal to the radiation received from grating 8. Grating 8 is tilted at such an angle that the maximum intensity in its diffraction pattern is directed toward the mirror 10. In the arrangement illustrated in the drawings, the grooves or rulings of the grating run horizontally.

As best shown in FIG. 3, the entrance slit 2 is offset slightly above the axis of the lens 6, and the exit slit 4 is offset slightly below that axis. The radiation is bent downward slightly as it passes through the lens from the entrance slit and plunges downward slightly as it passes through the remainder of the apparatus to the lens again. In the interest of clarity and brevity in the description, repeated reference to this plunging action will be avoided, but it will be understood that one or more of the components of the apparatus is adjusted in position slightly to take this into account. That is, where the positions of various components are specified, it will be understood, although not mentioned, that, in practical use, the positions may be adjusted slightly to provide for this plunging action.

While any type of grating may be used in the apparatus, a blazed type of grating, such as that shown in end view at FIG. 2, is preferred. As shown in FIG. 2, a blazed grating is ruled with parallel grooves of predetermined shape so that at least one side of the groove is flat, the direction normal to the flat side being referred to as the blaze. Thus, the blazed grating 8 provides a series of parallel plane surfaces 11 arranged angularly in steps on the face of the grating. In the particular grating shown in FIG. 2, the rulings have been formed so that the angle between a line normal to the grating and a line normal to the faces 11 of the grooves is 35°. In the illustrative apparatus shown in plan view in FIG. 1, where the plane of the paper may be regarded as a horizontal plane, the grating is tilted backward by an angle of approximately 35° with the vertical. Or in other words, to provide maximum intensity from the grating illustrated, the grating is tilted backward (about an axis parallel to the rulings on the grating) to an angle of approximately 35° with the plane of the incident and the used part of the diffracted radiation. With the grating thus positioned, the direction of the blaze of the grating lies in the plane of the incident radiation, and the used part of the diffracted radiation lies in the plane of the blaze of the grating. Other degrees of tilting would be required for gratings blazed at other angles.

With the grating tilted as described, the individual surfaces 11 of the grating are each vertical, in the embodiment illustrated. In this connection, note that the mirror 10 is also vertical.

The entrance and exit slits 2, 4 and the lens 6, in the apparatus, are fixed in position and the grating 8 and mirror 10 are rotatable about a vertical axis, that is, about an axis perpendicular to the direction of the grating rulings and perpendicular to the plane of the incident and the used portion of the diffracted radiation. As best shown in FIG. 3, the grating 8 is fixed, in its tilted position, to a mounting 16, and the mounting 16 is rotatably supported by a shaft 18, the grating 8 and mounting 16 being rotated by worm and wheel 20 operatively connected to gear train 22 by shaft 24. The mirror 10 is fixed to a mounting 30 and is rotatable by worm and wheel 32 and a shaft 34, the worm and wheel 32 being connected to gear train 22 by shaft 36. The gear train 22 is operated by shaft 40. To scan the spectrum, the shaft 40 is rotated, thereby rotating the grating 8 and the mirror 10. The worm and wheel 20, the worm and wheel 32, and the gear train 22 are proportioned to maintain the mirror 10 substantially normal to the used portion of the radiation diffracted by the grating 8 as the grating is rotated.

As shown, radiation enters the monochromator through the entrance slit 2 and after passing through the collimating lens 6 is diffracted by the grating 8 to the flat mirror 10, the mirror 10 reflecting the diffracted radiation back to the grating 8 for a second diffraction and, after a second diffraction by the grating 8, the radiation passes back through lens 6 to exit slit 4. As the grating and mirror are rotated, to successive different positions, radiation of different wave-lengths emerges through the exit slit.

In the embodiment shown in FIG. 3, the mirror 10 is rotated, about a common axis with that of the grating, through an angle twice the angle of rotation of the grating 8, in order to maintain the proper orientation between mirror 10 and grating 8. While the axis of rotation of the grating and the mirror have been shown and described as a common axis, the grating and mirror may be rotated about different axes so long as the axes are maintained parallel and proper relationship between rotation of the grating and rotation of the mirror is maintained to preserve proper orientation of the two elements. Regarding this orientation, it will be noted, as illustrated in FIG. 1, that as the grating and the mirror are rotated from a first position to a second position, a given used portion of the diffracted radiation which travels from the grating to the mirror along a certain path is returned by the mirror to the grating along almost that same path. (There is, of course, some plunging action, as may be seen in FIG. 3.)

Another embodiment of the apparatus is shown in FIG. 4. Here the lens 6 of the previous embodiment has been replaced with a concave mirror 50, and the entrance and exit slits 2, 4 have been relocated. The device of FIG. 4 operates in the same manner as that shown in FIGS. 1, 2 and 3, the concave mirror being employed as the collimator for use in those spectral regions where mirrors are better than lenses. Still other collimators may be substituted for those which have been described.

Referring now to FIG. 5, there is shown a modified reflector system for reflecting the used part of the diffracted radiation and returning such radiation to the grating for a second diffraction. In this modification of the apparatus, the flat mirror 10 of the previous embodiments has been replaced with a lens 52 and corner cube mirror or reflector generally indicated as 54. The corner cube mirror or reflector is formed by three mirrors 56, 58 and 60, each mirror being positioned perpendicular to the other two mirrors to form a rectangular corner, the reflecting surfaces of the respective mirrors facing inwardly into the corner. Thus, the mirrors 56, 58, 60 form three reflection surfaces each perpendicular to the other two. When this reflecting system is employed, the lens 52 and corner cube reflector 54 are fixed to the mounting 30, the corner cube reflector being tilted on the mounting in such a manner that the three reflecting or mirror surfaces are tilted equiangularly with the path of defracted radiation received from grating 8 through lens 52. As in the instance of the apparatus of FIG. 3, the lens 52 and corner cube reflector 54 are mounted and the gear trains proportioned to maintain the lens 52 normal to the used portion of the radiation diffracted by the grating 8, as the grating is rotated, while the corner cube reflector 54 is maintained so that each of its reflecting surfaces is maintained substantially equiangular to the used portion of the diffracted radiation.

In both the embodiments of FIGS. 1 to 3, and FIGS. 4 and 5, it will be noted that reflector means are mounted with respect to the grating to receive diffracted radiation from the grating and to reflect such diffracted radiation back to the grating. It is to be understood that reflection apparatus other than as shown in the attached drawings may be employed so long as the net effect is to cause the same inversions of the radiation.

One way of describing the correct arrangement and operation is to say that the radiation returning to the grating for a second diffraction is in the nature of a mirror image of that leaving the grating after the first diffraction. Thus, as seen by the grating, the net effect is that the beam of radiation is inverted in a manner sometimes referred to as right for left (as is done for example by a single mirror), but at the time of its return to the grating it is not inverted top for bottom. That is, radiation that was diffracted from one end of the grating the first time must be returned to the same end for the second diffraction, and radiation that was diffracted from one edge of the grating the first time must be returned to the same edge for the second diffraction.

The path of the radiation, from the time it leaves the grating after a first diffraction until it is returned to the grating for a second diffraction, may include various numbers of reflections from plane mirrors. Thus in the apparatus as shown in FIG. 1, the diffracted radiation is reflected once before its return to the grating, while in the apparatus of FIG. 5, the diffracted radiation is reflected three times. However, for purpose of the invention, the diffracted radiation could be reflected additional times from plane mirrors, and also focused into intermediate images provided that on its return to the grating the radiation is inverted in the same manner as if it had been reflected directly back by a single plane mirror. The method of accomplishing the desired inversion described above may be by means of mirrors, lenses, prisms or combinations of them.

An important advantageous characteristic of the aforedescribed devices is that there is no rotation of the image of the entrance slit at the exit slit.

In addition, the radiation is twice diffracted, doubling the dispersion and the theoretical resolution, a result highly desirable in a device of this type.

A further advantage is that there is a reduction in the variation of image curvature with wave length, thereby permitting the use of larger ratios of slit length to focal length and thereby providing a more efficient instrument. Where gratings with long rulings are used, wide ranges of wave length can be scanned continuously with good intensity and resolution throughout the range.

In certain cases, where the apparatus is being employed to sense diffracted radiation of a given wave length, of a certain order, there may be paths by which radiation of a different wave length, and of a different order, might reach the exit slit, if provision were not made to prevent this. This may be prevented by limiting the free spectral range, as, for example, by the use of a fore-prism, prior to the entrance slit, capable of excluding wave lengths which might produce such effects. Alternatively, appropriate filtering may be employed. Still another way of eliminating this effect is by proper proportioning of the height of the grating to the height of the mirror. In other words, the height of the grating is reduced in the direction across the rulings so that undesired radiation will not strike the grating upon return from the mirror and, with the desired radiation, return to the exit slit. If desired, the radiation may be passed through a supplemental monochromator before its introduction into the entrance slit of the apparatus of the invention.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a monochromator, in combination, means forming an entrance slit, means forming an exit slit, a diffraction grating, optical means including a mirror positioned to receive diffracted radiation from said grating, means for directing radiation along a path from said entrance slit to said grating for a first diffraction, thence to said optical means, thence back to said grating for a second diffraction, and thence to said exit slit, and means for rotating said grating about an axis substantially perpendicular to the direction of the rulings of said grating, said axis being also substantially perpendicular to the path of the radiation incident on said grating from said entrance slit.

2. In a monochromator, in combination, means forming an entrance slit, means forming an exit slit, a diffraction grating having rulings, optical means including a mirror positioned to receive diffracted radiation from said grating, means for directing radiation along a path from said entrance slit to said grating for a first diffraction, thence to said optical means, thence back to said grating for a second diffraction, and thence to said exit slit, whereby the used component of said diffracted radiation emerges from said exit slit, means for rotating said grating about an axis perpendicular to the direction of the rulings of said grating, said axis being also substantially perpendicular to the direction of the radiation incident on said grating from said entrance slit, said grating, throughout its said rotation, being positioned to direct the used component of said diffracted radiation along said path with maximum intensity.

3. Apparatus according to claim 2, in which said grating is of the blazed type, said grating being maintained, throughout its rotation, tilted at such an angle that the directions of the radiation incident on the grating, of the used part of the diffracted radiation, and the blaze of the grating, lie in a common plane.

4. Apparatus according to claim 2, including means for rotating said mirror, in the same direction as the rotation of said grating, about an axis perpendicular to the direction of the rulings of said grating.

5. In a monochromator, in combination, means forming an entrance slit, means forming an exit slit, a reflection-type diffraction grating having rulings, mirror means, means for directing radiation along a path from said entrance slit to said grating for a first diffraction, thence to said mirror means, thence back to said grating for a second diffraction and thence to said exit slit, and scanning means for rotating said grating about an axis perpendicular to the direction of said rulings.

6. In a monochromator, in combination, means forming an entrance slit, means forming an exit slit, a reflection-type diffraction grating having rulings, mirror means, means for directing radiation along a path from said entrance slit to said grating for a first diffraction, thence to said mirror means, thence back to said grating for a second diffraction and thence to said exit slit, and scanning means for rotating said grating about an axis perpendicular to the direction of said rulings, said mirror means being adapted to receive radiation from said grating and to return it to said grating, along such paths that radiation received from a given edge of said grating returns to that same edge, and radiation received from a given end of said grating returns to that same end.

7. In a monochromator, in combination, means forming an entrance slit, means forming an exit slit, a diffraction grating having rulings, optical means including a reflecting surface positioned to receive diffracted radiation from said grating, means for directing radiation along a path from said entrance slit to said grating for a first diffraction, thence to said optical means, thence back to said grating for a second diffraction, and thence to said exit slit, and means for rotating said grating and said reflecting surface about an axis perpendicular to the direction of the rulings of said grating, said axis being also substantially perpendicular to the path of the radiation incident on said grating from said entrance slit.

8. Apparatus according to claim 7 in which said grating is maintained, throughout said rotation, in such positions that the radiation which is incident on it from said entrance slit for said first diffraction and the radiation which is returned to it for said second diffraction strikes it at oblique angles with respect to the direction of its rulings.

9. In a monochromator, in combination, means forming an entrance slit, means forming an exit slit, a diffraction grating having rulings, a corner cube reflector, a first focusing element between said entrance slit and said diffraction grating, a second focusing element between said diffraction grating and said corner cube reflector, means for directing radiation along a path from said entrance slit through said first focusing element to said grating for a first diffraction, thence through said second focusing element to said corner cube reflector, thence back through said second focusing element to said grating for a second diffraction and thence through said first focusing element to said exit slit, and scanning means for rotating said grating about an axis perpendicular to the direction of said rulings, said second focusing element and said corner cube reflector being adapted to receive radiation from said grating and return it to said grating along such paths that radiation received from a given edge of said grating returns to that same edge, and radiation received from a given end of said grating returns to that same end.

References Cited in the file of this patent

UNITED STATES PATENTS

| | | |
|---|---|---|
| 2,856,531 | Brouwer | Oct. 14, 1958 |
| 2,922,331 | Fastie et al. | Jan. 26, 1960 |
| 2,945,953 | Martin | July 19, 1960 |

OTHER REFERENCES

Bausch and Lomb catalog: "Diffraction Gratings," pages 7 and 8 cited.